April 18, 1939.　　　　H. J. EDWARDS　　　　2,154,929
MECHANISM CONTROL
Filed Jan. 29, 1937
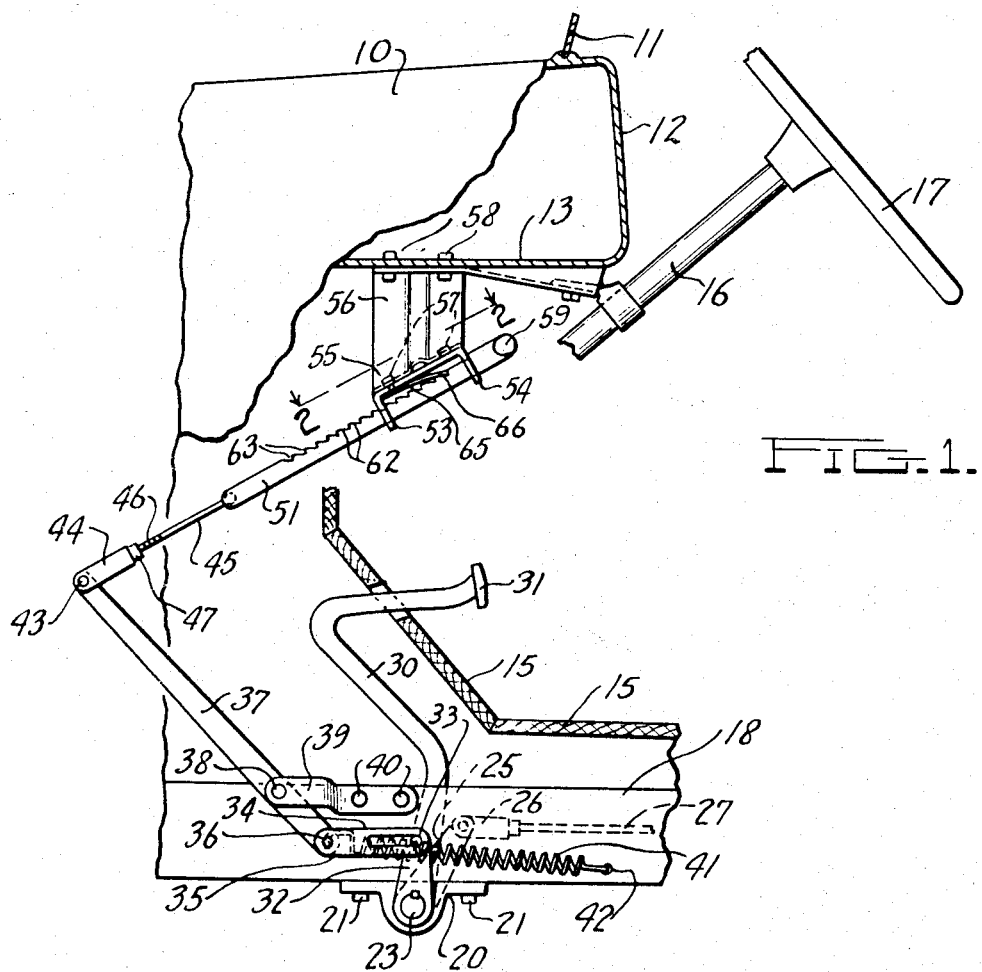
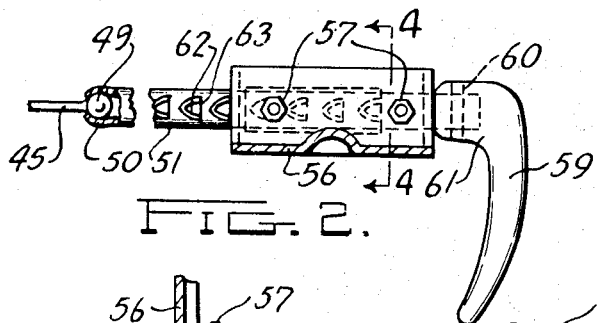
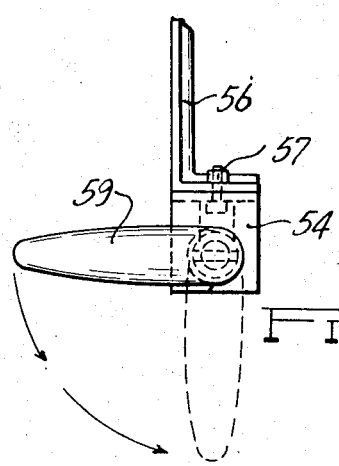
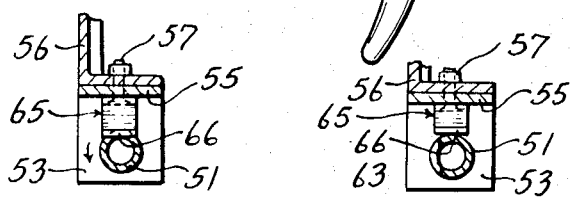
INVENTOR
Henry J. Edwards
BY
Braselton Whitcomb Davies
ATTORNEY Patented Apr. 18, 1939

2,154,929

UNITED STATES PATENT OFFICE 2,154,929

MECHANISM CONTROL

Henry J. Edwards, Ottawa Hills, Ohio, assignor to Willys-Overland Motors, Inc., Toledo, Ohio, a corporation of Delaware Application January 29, 1937, Serial No. 122,929

1 Claim. (Cl. 74—503)

This invention relates to mechanism control and more particularly to an arrangement for actuating or controlling braking mechanism of a vehicle.

The invention embraces the provision of a brake control mechanism having a manipulating member which moves in substantially straight line for actuating the braking mechanism to "set" position and which may be partially rotated and moved linearly to effect release of the braking mechanism.

A further object of the invention resides in the provision of a simple and effective means for providing a manual brake controlling means especially adapted for mounting adjacent the instrument panel, thus eliminating such mechanism from the floor of the vehicle and at the same time placing the brake manipulating means within convenient reach of the vehicle operator.

Still another object of the invention is the provision of a simple yet effective brake control means in which the major number of parts are fabricated of sheet metal, thus enhancing the interchangeability of the parts as well as effecting economies in manufacture and assembly.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a partial sectional view through the forward portion of the vehicle body illustrating a form of brake controlling means of my invention;

Figure 2 is a detail sectional view taken substantially on the line 2—2 of Figure 1;

Figure 3 is a front elevational view of the brake controlling means of my invention;

Figure 4 is a fragmentary detail sectional view taken substantially on the line 4—4 of Figure 2 showing the position of certain parts when the brakes are in "set" position;

Figure 5 is similar to Figure 4 showing the mechanism in brake releasing position.

While I have illustrated the control mechanism of my invention as utilized for manipulating brakes of an automotive vehicle, it is to be understood that I contemplate the utilization in conjunction with any mechanism where the same may be found to be applicable.

In the arrangement as illustrated, numeral 10 indicates the forward portion of a vehicle body having a windshield 11, instrument panel 12, floor boards 15, steering post 16, steering wheel 17, and a chassis frame 18. Preferably secured to chassis frame 18 is a pair of spaced brackets 20 (one only of which is illustrated) secured to the chassis frame by means of bolts 21 or other suitable means, the brackets supporting a shaft 23 extending transversely of the vehicle frame. Keyed or otherwise fixedly secured to the shaft is an arm 25 to which is secured a clevis member 26, the latter in turn being connected to a brake actuating rod 27 or other suitable brake actuating intermediary. Also fixedly secured to the shaft 23 is an upwardly projecting pedal member 30 projecting through an opening in the floor boards 15, the pedal having a foot pad portion 31, the arrangement being such that depression of the pedal member rotates the shaft 23, thus exerting a pull upon the brake actuating means 27 to set the brakes of the vehicle.

Also secured to shaft 23 is an arm 32 carrying a pin 33 at its upper extremity, the latter projecting into a longitudinal slot 34 formed in a member 35, one end of member 35 being pivotally connected by means of a pin 36 to one end of lever 37. The lever 37 is fulcrumed upon pin or shaft 38 which is carried in the end portion of a bracket 39, the latter being secured to the chassis frame 18 in a suitable manner as by means of bolts 40, the lever being normally urged toward brake releasing position by means of coil spring 41 having one extremity connected to pin 36 and the other connected as at 42 to the chassis frame.

Secured to the upper end of lever 37 by means of a pin 43 is a clevis member 44 to which is connected a rod 45, the latter having an extremity which is threaded as at 46 and is received in a threaded opening in the clevis member 44. The rod may be locked in adjusted position by means of a nut 47.

As particularly shown in Figures 1 and 2, the rod 45 is provided at its other extremity with a ball portion 49 which extends into the end of a hollow tubular member 51, the end of the tube 51 being formed as at 50 as illustrated in Figure 2 to retain the ball portion of rod 45 in engagement with member 51 and yet permit rotation of member 51 independent of the rod 45.

The hollow tubular member 51 passes through aligned openings in depending ears 53 and 54 of a bracket or support 55, the latter in turn being secured to a member 56 by means of bolts 57 which is supported upon a projection 13 connected to the instrument panel 12, the member 56 being secured to projection 13 by means of bolts 58 or other suitable means. There is sufficient clearance between the exterior walls of the member 51 and the openings in the depending portions 53 and 54 of bracket 55 to permit longitudinal slidable movement of the member 51, the latter being provided at its forward extremity with a transversely extending handle 59 which is held to member 51 by means of a pin 60 passing through a boss portion 61 of handle member 59 and an extremity of member 51 projecting into a bore in the boss portion.

As particularly illustrated, a portion of the exterior surface of member 51 is provided with a series of spaced depressions or notches 62 forming a series of spaced ratchet shaped teeth 63, the configuration of the notches as viewed in top plan being illustrated in Figure 2. Secured to bracket 55 by means of one of the bolts 57 is a pawl means in the form of a spring plate 65 having its forward extremity 66 curved to engage the teeth 63 in the member 51, the plate serving to retain member 51 in adjusted or brake setting position by engagement with the proper tooth in member 51.

It will be noted from examination of Figures 1 and 4 that when the handle portion 59 extends in a substantially horizontal position that the teeth 63 are in alignment with and adapted to be engaged by the extremity 66 of the spring plate 65. When the handle 59 is rotated through substantially ninety degrees as indicated in Figure 3, member 51 is likewise rotated so that the notches are brought to the position as indicated in Figure 5 so that the extremity of plate 65 contacts only with the smooth exterior contour of member 51.

In the manipulation of the control means of my invention when it is desired to effect a setting of the brakes, the handle 59 while in horizontal position as illustrated in Figure 1 is grasped by the operator and longitudinal force exerted thereupon causes a sliding movement of member 51 relative to the support 55 oscillating lever 37 about its pivot or fulcrum point, and through the medium of pin 33 and arm 32 causes rotation of the shaft 23 to set the brakes. The plate 65 engages one of the teeth 63 in member 51 to retain the latter in brake setting position. In order to release the brakes, the operator rotates the handle member 59 and consequently member 51 through substantially ninety degrees, that is, to the dotted line position as indicated in Figure 3, which brings the toothed portion of member 51 into the position illustrated in Figure 5, thus disengaging plate 65 from engagement with teeth 63 and under the influence of the coil spring 41 causes slidable movement of member 51 with respect to bracket 55 bringing member 51 to its innermost or brake releasing position. The handle 59 may then be returned to its horizontal position to be in an effective position of use when it is again desired to manipulate the brakes. The depressions or notches 62 as particularly illustrated in Figure 2 are preferably of sufficient depth to cut through the side wall of the tubular member 51 forming openings. These openings have the advantage that any debris or other foreign matter which would normally collect in these depressions will pass through to the interior of the member 51, thus maintaining the depressions free from dust, dirt, and the like and insuring effective engagement of the teeth with the pawl means.

It is to be noted that due to the arrangement of pin 33 operating in slot 34 in member 35, the service brake pedal 30 may be actuated independently of the hand operated brake of my invention.

It is apparent that within the scope of the invention, modifications and different arrangements may be made other than is herein disclosed, and the present disclosure is illustrative merely, the invention comprehending all variations thereof.

What I claim is:

Brake controlling means comprising, in combination, a lever adapted to be connected to braking means; a supporting member formed of sheet metal and having transversely extending ear portions, said ear portions having aligned openings therein; a tubular member slidably mounted in the openings in said support; means including a ball joint connecting said tubular member with said lever, said tubular member having a series of depressions extending through the wall thereof forming teeth; a plate spring associated with said support and engageable with the teeth to hold the tubular member in brake setting position, said tubular member being adapted for rotation to effect the disengagement of said plate with the teeth.

HENRY J. EDWARDS.